United States Patent Office 2,902,505
Patented Sept. 1, 1959

2,902,505

ORGANOSILICON POLYBORANES

Dietmar Seyferth, Midland, Mich., assignor to Dow Corning Corporation, Midland, Mich., a corporation of Michigan No Drawing. Application March 5, 1956
Serial No. 569,223

9 Claims. (Cl. 260—448.2)

This invention relates to novel organosilicon compounds containing two or more boron atoms per molecule.

It is the object of this invention to provide novel organosilicon compounds of boron which are soluble in organopolysiloxane fluids and which are useful as oxygen scavengers for such fluids. Another object is to provide new compositions of matter which are useful in stabilizing lubricants, hydraulic fluids, dielectric fluids and fluids for electronic devices.

This invention relates to compounds of the formula $$R_x[B(CH)_n Si O Si(CH)_n]_m (BR_2)_2$$
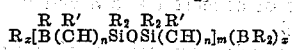

in which $x$ is an integer from 0 to 1, R is a monovalent hydrocarbon radical, R' is of the group hydrogen and alkyl radicals, $n$ and $m$ are both integers of at least 1.

The compositions within the scope of the above generic formula comprise two basic species. The first species includes disiloxanediboranes of the general formula $$R_2B(CH)_n Si O Si(CH)_n BR_2$$
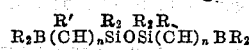

These materials are best prepared by a Barbier reaction involving addition of a mixture of a hydrocarbon halide, a trihaloborane or a trialkoxy borane and a disiloxane of the formula $$X(CH)_n Si O Si(CH)_n X$$
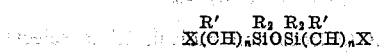

(X is halogen), in the molar ratio of 2, 1 and .5 respectively, to magnesium in ether. This reaction will proceed in the conventional manner for carrying out Barbier reactions. After reaction is complete the magnesium salts are filtered off and the product recovered from the ether solution.

These disiloxanediboranes can be copolymerized with conventional diorganosiloxanes by conventional alkaline or acid equilibration procedures to give copolymers of the basic formula $$R_2B(CH)_n Si O (SiO)_y Si(CH)_n BR_2$$
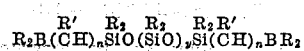

in which $y$ is an integer of at least one and R, R' and $n$ are as above defined.

The second basic species of this invention includes polymeric siloxane boranes of the unit formula $$[-B(CH)_n Si O Si(CH)_n-]_m$$
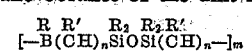

This type of compound is also best prepared by the above described Barbier reaction except that the reactants are employed in the molar ratio of 1 mol hydrocarbon halide, 1 mol of trihalo or trialkoxy borane and .5 mol of $$X(CH)_n Si O Si(CH)_n X$$

These polymeric siloxane boranes can be interacted with diorganosiloxanes of the unit formula $R_2SiO$ to give copolymers having the molecular structure $$[Si(CH)_n B(CH)_n SiO]_a [SiO]_b$$
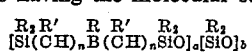

in which $a$ and $b$ can be varied to give any desired proportion of boron containing units. Thus $a$ and $b$ range from .001 to 99.999. The second species can also be interacted with triorganosiloxanes to give polymers of the formula $$R_3SiO[Si(CH)_n B(CH)_n SiO]_m SiR_3$$
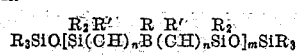

in which $m$ has a value of at least 2. These latter two types of copolymers are also prepared by conventional alkaline interaction commonly used for preparing siloxane copolymers.

For the purpose of this invention the R groups on the boron and on the silicon can be any monovalent hydrocarbon radical such as alkyl radicals such as methyl, ethyl, butyl and octadecyl; alkenyl radicals such as vinyl, allyl and hexenyl; cyloaliphatic radicals such as cyclohexyl, cyclopentyl and cycyohexenyl; aralkyl radicals such as benzyl and aromatic hydrocarbon radicals such as phenyl, xenyl, tolyl, naphthyl and xylyl. It should be understood that in any particular molecule all the R groups can be the same or there can be any combination of different R groups attached to the boron and silicon atoms.

For the purpose of this invention R' can be hydrogen or any alkyl radical such as methyl, ethyl or octadecyl. With respect to the R' groups it should be understood that where $n$ is greater than 1, some of the R' can be hydrogen and some alkyl. Thus, specific examples of $$\left(\begin{smallmatrix} R' \\ CH \end{smallmatrix}\right)_n$$

groups are ($CH_2$), $$(CH_2CHCH_2), (CHCH)$$
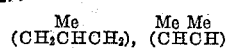

and ($CH_2CH_2CH_2CH_2$).

The following examples are illustrative only and should not be construed as limiting the invention which is properly delineated in the appended claims. In the formulas below the hydrocarbon radicals are designated by the first two letters in their names such as Me for methyl, Ph for phenyl, Vi for vinyl, etc.

*Example 1*

24.32 g. of magnesium in 250 ml. of ether was activated with a few mol of butyl magnesium bromide and a mixture of 155 g. of bis-chloromethyltetramethyldisiloxane, 46 g. of butyl bromide and 35 g. of trimethoxy borane was run into the activated magnesium-ether mixture. An exothermic reaction took place. After the reaction subsided the mixture was refluxed for 3½ hours. The magnesium salts were then hydrolyzed with saturated ammonium chloride solution and the organic layer decanted and dried over anhydrous sodium sulfate. The ether was then removed by distillation and the residue was shown by analysis to be essentially a polymer of the unit formula $$(BCH_2 SiOSiCH_2)_x$$

This material was in the form of a yellowish oil.

A 5 percent solution of this oil in 30 g. of a 200 cs. trimethyl end-blocked dimethylpolysiloxane fluid absorbed 82.3 cc. of oxygen under standard conditions of temperature and pressure.

*Example 2*

A mixture of .22 mol of bis-chloromethyltetramethyldisiloxane, .44 mol of the compound $BF_3 \cdot Et_2O$ and 1.2 mols of butyl bromide was added to 1.5 g. atoms of magnesium in 260 ml. of ether. The reaction proceeded at reflux temperature and during the course of the reaction 150 cc. additional ether was added. The product was then refluxed for two hours longer and was then worked up in the manner of Example 1. The product was a yellow oil having the formula $$Bu_2BCH_2\overset{Me_2}{Si}O\overset{Me_2}{Si}CH_2BBu_2$$

A five percent solution of this oil in 30 g. of the siloxane in Example 1, absorbed 61 cc. of oxygen under standard conditions of temperature and pressure.

*Example 3*

When 1 mol of BF₃·Et₂O, 2 mols of vinyl magnesium bromide and .5 mol of the compound $$ClCH_2\overset{Me}{\underset{Me}{C}}HCH_2\overset{Ph}{Si}O\overset{Bu}{\underset{Vi}{Si}}CH_2Cl$$

is reacted in the manner of Example 2, the fluid compound $$Vi_2BCH_2\overset{Me}{\underset{Me}{C}}HCH_2\overset{Ph}{Si}O\overset{Bu}{\underset{Vi}{Si}}CH_2BVi_2$$

is obtained.

*Example 4*

When 1 mol of B(OMe)₃, 1 mol of phenyl magnesium bromide and ½ mol of the compound $$ClCHCH\overset{Me}{\underset{}{Si}}O\overset{Me}{\underset{}{Si}}\text{---}CHCHCl$$
$$\overset{Me}{}\overset{Et_2}{}\overset{Ph_2}{}\overset{Me}{}$$

are reacted in accordance with the procedure of Example 1, the fluid polymeric compound $$(B\text{---}CH\text{---}CH\text{---}Si\text{---}O\text{---}Si\text{---}CH\text{---}CH)_x$$
Ph Me  Me  Et₂  Ph₂Me  Me is obtained.

*Example 5*

When 1804 g. (8 mols) of the siloxane borane of Example 1 is interacted with 1 mol of hexamethyldisiloxane in the presence of .1 g. of the salt Me₃SiOK at 90° C. a fluid copolymer of the average formula $$Me_3SiO(\overset{Me_2}{Si}CH_2\overset{Bu}{B}CH_2\overset{Me}{Si}O)_8SiMe_3$$

is obtained.

*Example 6*

When 22.8 g. (.1 mol) of the fluid borane siloxane of Example 1 is interacted with 122.4 g. (.9 mol) of phenylmethylsiloxane at 150° C. in the presence of 2 g. of Me₃SiOK, a fluid copolymer of the average composition $$(\overset{Me_2}{Si}CH_2\overset{Bu}{B}CH_2\overset{Me_2}{Si}O)_{.1}(\overset{Ph}{\underset{Me}{Si}}O)_{.9}$$

is obtained.

*Example 7*

When a mixture of 1 mol of the siloxane borane of Example 2 and 1 mol of (MeViSiO)₄ is heated at 100° C. in the presence of .1 g. of Me₃SiOK, a fluid copolymer of the average formula $$Bu_2BCH_2\overset{Me_2}{Si}O(\overset{Me}{\underset{Vi}{Si}}O)_4\overset{Me_2}{Si}CH_2BBu_2$$

is obtained.

That which is claimed is:

1. A composition of matter having the general formula $$R_x[B(\overset{R}{\underset{}{C}}H)_n\overset{R'}{Si}O\overset{R_2}{Si}(CH)_n]_m(BR_2)_x$$

in which x is an integer from 0 to 1, R is a monovalent hydrocarbon radical, R' is of the group consisting of hydrogen and alkyl radicals and n and m are both integers of at least 1 such that when x is 1, m is 1.

2. A composition of matter having the unit formula $$(\text{---}B\overset{Bu}{\underset{}{C}}H_2\overset{Me_2}{Si}O\overset{Me_2}{Si}CH_2\text{---})$$

3. A composition of matter having the formula $$Bu_2BCH_2\overset{Me_2}{Si}O\overset{Me_2}{Si}CH_2BBu_2$$

4. A copolymeric composition of matter having the general formula selected from the group consisting of $$R_2B(\overset{R'}{\underset{}{C}}H)_n\overset{R_2}{Si}O(\overset{R_2}{Si}O)_y\overset{R_2R'}{Si}(CH)_nBR_2$$

$$[\overset{R_2R'}{Si}(CH)_n B(\overset{R}{\underset{}{C}}H)_n\overset{R}{\underset{}{Si}}O]_a(\overset{R_2}{Si}O)_b$$

and $$R_3SiO[\overset{R_2R'}{Si}(CH)_n B(\overset{R R'}{\underset{}{C}}H)_n\overset{R_2}{Si}O]_mSiR_3$$

in which R is a monovalent hydrocarbon radical, R' is selected from the group consisting of hydrogen atoms and alkyl radicals, n and y are both integers of at least 1, a and b both vary from .001 to 99.999, and m is an integer of at least 2.

5. A copolymeric composition of the general formula $$R_2B(\overset{R'}{\underset{}{C}}H)_n\overset{R_2}{Si}O(\overset{R_2}{Si}O)_y\overset{R_2R'}{Si}(CH)_nBR_2$$

in which R is a monovalent hydrocarbon radical, R' is of the group consisting of hydrogen and alkyl radicals and n and y are both integers of at least 1.

6. A copolymeric composition of the general formula $$[\overset{R_2R'}{Si}(CH)_n B(\overset{R R'}{\underset{}{C}}H)_n\overset{R_2}{Si}O]_a(\overset{R_2}{Si}O)_b$$

in which R is a monovalent hydrocarbon radical, R' is of the group consisting of hydrogen and alkyl radicals, n is an integer of at least 1 and a and b both vary from .001 to 99.999.

7. A copolymeric composition of matter having the general formula $$R_3SiO[\overset{R_2R'}{Si}(CH)_n B(\overset{R R'}{\underset{}{C}}H)_n\overset{R_2}{Si}O]_mSiR_3$$

in which R is a monovalent hydrocarbon radical, R' is of the group consisting of hydrogen and alkyl radicals, n is an integer of at least 1 and m is an integer of at least 2.

8. A method of preparing copolymeric compositions which comprises interacting (1) a compound of the general formula $$[\text{---}B(\overset{R R'}{\underset{}{C}}H)_n\overset{R_2}{Si}O\overset{R_2R'}{Si}(CH)_n\text{---}]_m$$

R is a monovalent hydrocarbon radical, R' is selected from the group consisting of hydrogen and alkyl radicals and n and m are both integers of at least 1, with (2) a siloxane in which the siloxane units are of the group consisting of R₂SiO and R₃SiO.₅ units in which R is a monovalent hydrocarbon radical, whereby a copolymer of (1) and (2) is formed.

9. A method of preparing copolymeric compositions which comprises interacting (1) a compound of the general formula $$R_2B(\overset{R'}{\underset{}{C}}H)_n\overset{R_2}{Si}O\overset{R_2R'}{Si}(CH)_nBR_2$$

in which R is a monovalent hydrocarbon radical, R' is selected from the group consisting of hydrogen and alkyl radicals and n is an integer of at least 1, with (2) a siloxane of the unit formula R₂SiO in which R is a monovalent hydrocarbon radical, whereby a copolymer of (1) and (2) is formed.

References Cited in the file of this patent

UNITED STATES PATENTS

| | | |
|---|---|---|
| 2,434,953 | Patnode | Jan. 27, 1948 |
| 2,517,945 | Upson | Aug. 8, 1950 |

UNITED STATES PATENT OFFICE
Certificate of Correction

Patent No. 2,902,505                                                                September 1, 1959

Dietmar Seyferth

It is hereby certified that error appears in the printed specification of the above numbered patent requiring correction and that the said Letters Patent should read as corrected below.

Column 1, lines 34 and 35, the formula should read as shown below instead of as in the patent:

column 2, line 17, for "cycyohexenyl" read —cyclohexenyl—; column 3, lines 37 and 38, the formula should read as shown below instead of as in the patent:

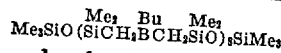

column 4, lines 8 and 9, the formula should read as shown below instead of as in the patent:

column 4, line 46, before "R" insert —in which—.

Signed and sealed this 26th day of April 1960.

[SEAL]

Attest:
KARL H. AXLINE,
*Attesting Officer.*

ROBERT C. WATSON,
*Commissioner of Patents.*